March 22, 1938. G. O. WILMS ET AL Re. 20,676

ELECTRIC SWITCH

Original Filed July 11, 1935 2 Sheets-Sheet 1

Inventors
Gustav O. Wilms
Hans Petersen
By [illegible]
Attorney

March 22, 1938. G. O. WILMS ET AL Re. 20,676

ELECTRIC SWITCH

Original Filed July 11, 1935 2 Sheets-Sheet 2

Inventors
Gustav O. Wilms
Hans Petersen
By Smith & Jones
Attorneys

Reissued Mar. 22, 1938 Re. 20,676

UNITED STATES PATENT OFFICE 20,676

ELECTRIC SWITCH

Gustav O. Wilms, Milwaukee, and Hans Petersen, Wauwatosa, Wis., assignors to Allen-Bradley Company, Milwaukee, Wis., a corporation of Wisconsin Original No. 2,071,149, dated February 16, 1937, Serial No. 30,790, July 11, 1935. Divided and application January 8, 1937, Serial No. 119,555. Patent No. 2,090,170, dated August 17, 1937. Application for reissue February 9, 1938, Serial No. 189,471

6 Claims. (Cl. 200—104)

This invention relates to improvements in electric switches and refers more particularly to electromagnetically actuated control switches of the type shown in Reissue Patent No. 20,094, issued to Gustav O. Wilms, et al., September 1, 1936 and is a division of application, Serial No. 30,790, filed July 11, 1935, now Patent No. 2,071,149, February 16, 1937.

As in the patent above noted, the switch of this invention is of the solenoid type wherein the movable contacts have a straight line motion to and from engagement with their respective stationary contacts, but in this instance all of the contacts are enclosed within a novel insulated arc enclosing chamber so constructed that while it completely encloses the contacts, access for inspection and replacement of contacts are readily had. The movable contacts are actuated from the exterior of the enclosure by a solenoid type electromagnet.

This invention has as a general object to improve the construction of switches of this character and to provide a stronger and simpler manner of assembling the component parts of the switch.

More specifically it is an object of this invention to provide a switch which is so constructed that alignment between the stationary and movable contacts is assured automatically upon assembly of the component parts of the switch, and which is self-insulating so that it may be mounted directly on a machine part.

A further object of this invention is to provide a rigid and strong mounting means for the switch structure and accompanying devices and to make the whole assembly universal for mounting purposes in that no additional insulation is necessary.

Still a further object of this invention is to provide a rigid and universal mounting means for switches at a reduction in cost, material, weight, and labor.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
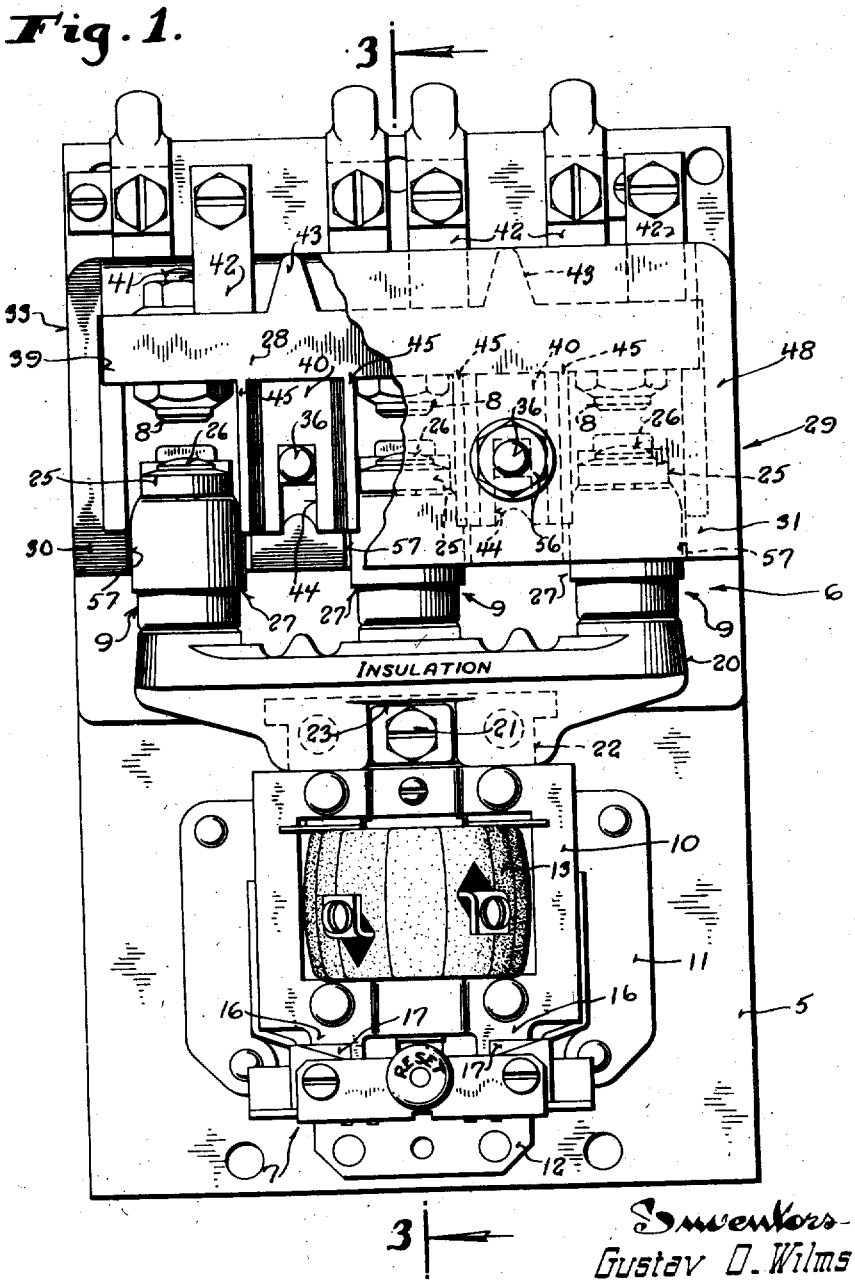
Figure 1 is a front view of a switch embodying this invention, parts thereof being broken away and in section.
Figure 3:
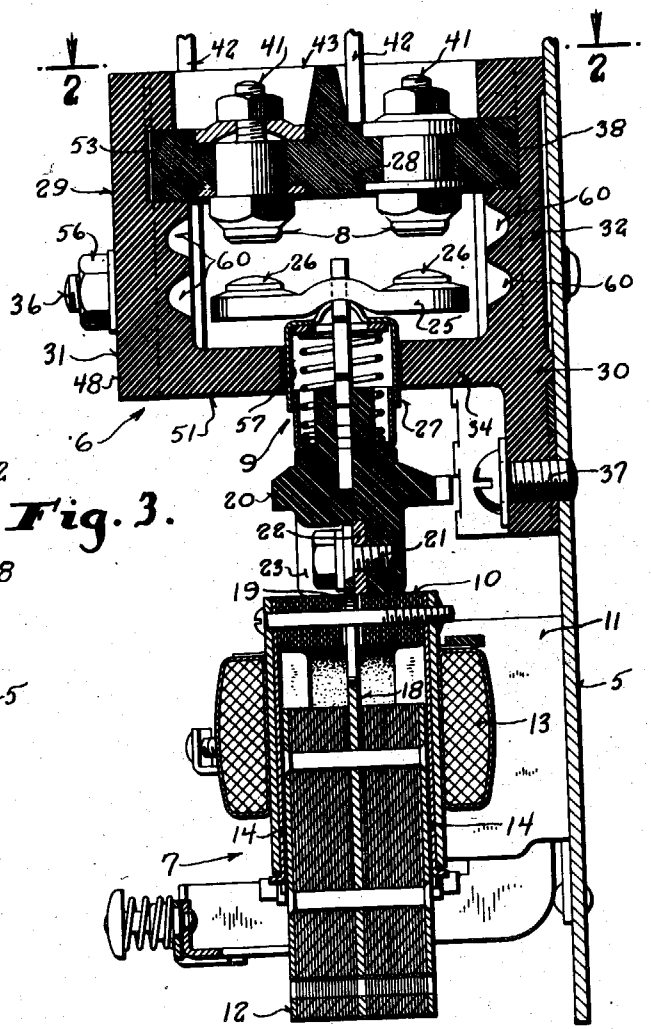
Figure 3 is a longitudinal sectional view through Figure 1 on the plane of the line 3—3.

Referring now particularly to the accompanying drawings in which like numerals indicate like parts throughout the several views, the numeral 5 designates a flat sheet metal panel or backing plate upon which the switch mechanism, indicated generally by the numeral 6, and its actuating electromagnet 7 are mounted. The switch mechanism comprises a plurality of pairs of stationary contacts 8 adapted to be electrically bridged by movable contact units 9 actuated in a straight line motion by the electromagnet.

The electromagnet 7 has a laminated field piece 10 which is rigidly mounted on the panel 5 by means of a bracket 11. The field piece 10 has substantially an inverted U-shape and has an armature 12 slidably received between its legs, the lower ends of which are directed inwardly toward each other to lie close to the armature.

Within the hollow of the field piece is a coil 13 readily detachably held in place by channel-shaped guideways 14 in which the armature slides.

The poles of the field piece are provided by downwardly extending projections 16 on which shading coils 17 are mounted in the customary manner.

The armature 12 is of inverted T-shape with its stem or shank slidable in the guideways 14 and its head projecting to opposite sides for coaction with the poles 16. Like the field piece, the armature is of laminated construction. A central lamination 18 is formed of nonmagnetic metal and slidably projects through an opening 19 in the top of the field piece.

Attached to the projecting upper end portion of the lamination 18 is a contact carrier 20. This carrier 20, which is fastened to the lamination 18 by a screw 21, comprises a bar of molded insulating material with a metal insert 22 providing a reinforcing rib therefor. The front of the molded cross bar has a recess 23 to expose the adjacent central part of the metal reinforcing rib 22 so that the lamination 18 is engageable directly therewith.

The movable contact units 9 (three in this instance) are mounted on the carrier 20. The specific construction of these contact units forms no part of this invention, and therefore will not be described. For a detailed description thereof reference may be had to the aforementioned application of which this is a division. It is desired to note, however, that each contact unit comprises a contact bar 25 equipped with contacts 26 of a silver-cadmium alloy electro-welded to its end portions, and that the bar is resiliently supported from the carrier 20, the resilient mounting incorporating a telescoped spring enclosure 27.

The stationary contacts 8 are fixed to the top wall 28 of an arc enclosing or arc suppressing chamber, indicated generally by the numeral 29. This chamber differs from arc hoods of the past in that it is totally enclosed and provides a complete enclosure for the contacts. It consists of three separable interengaging sections, a base or rear section 30, the top wall 28, and a cover or front section 31.

The base or rear section 30 comprises a rear wall 32, side walls 33, and a bottom wall 34, the rear wall 32 projecting down beneath the bottom wall 34.

The rear wall 32 has two spaced square openings to snugly receive mounting posts 36 riveted or otherwise fixed to the metal panel 5. The base section is held on the posts 36 in flat engagement with the panel by a screw 37 passed through the downwardly projecting part of the rear wall and threaded into the panel 5.

The rear and side walls 32 and 33, respectively, of the base section have connecting grooves 38 and 39, respectively, formed in their inner faces to snugly receive the adjacent edge portions of the upper section of the arc enclosing chamber comprising the top wall 28. The top wall 28 is thus slidably engageable with the base or rear section from the front of the switch.

This top wall 28 has two downwardly projecting webs 40 which provide partition walls to divide the interior of the arc enclosing or arc suppressing chamber into three separated compartments. Obviously, each pair of stationary contacts 8 is disposed in one of the compartments thus formed and likewise, the cooperating movable contacts move in these separated compartments for coaction with the stationary contacts.

The stationary contacts, like the movable contacts, are formed of a silver cadmium alloy and are electro-welded onto the heads of copper bolts 41, the stems of which project through and above the top wall to also mount terminals 42. The top wall 28 thus not only provides one wall of the arc hood, but also serves as a terminal head to which the stationary contacts and their terminals are secured, and it is to be noted that the terminals for the contacts are offset with respect to each other so that all of them are readily accessible from the front of the switch to facilitate the attachment of conductor wires thereto.

Figure 2:
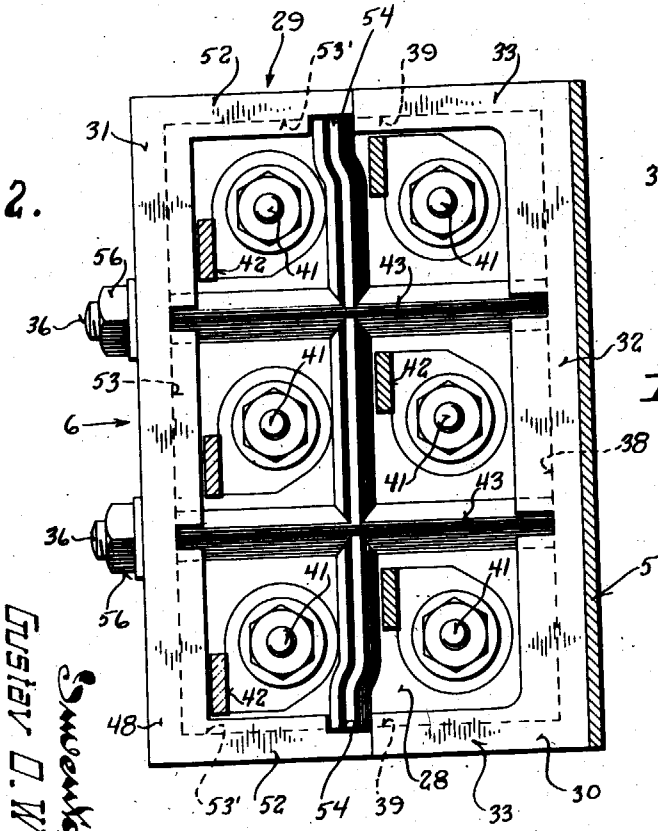
Figure 2 is a sectional view of the switch through Figure 3 on the plane of the line 2—2 showing particularly the arc enclosing chamber properly assembled.

The upper surface of the top wall 28 is provided with upstanding ribs 43 which divide the top thereof into compartments so as to isolate the respective terminals from each other. The central longitudinal rib has its ends offset as shown in Figure 2 and has its extremities overlying the adjacent edges of the side walls 33.

When the top wall is properly assembled with the base or rear section of the arc enclosing chamber the engagement between the ends of this central rib and the front edges of the side walls 33 permits the top wall to move all the way back, but if the top wall is inserted in reversed position, i. e., with its front edge rearward, the engagement of the extremities of the central rib with the front edges of the side walls 33 will preclude complete and proper assembly of the top wall with the base or rear section, and, as will be hereinafter described, will preclude the application of the cover or front section, thus clearly indicating that the top wall has been improperly applied.

The webs 40, which serve as the partitions between the respective contact compartments, are longitudinally channeled as at 44 to snugly receive and embrace the mounting posts 36. In so embracing the posts, the webs or partition walls afford adequate insulation for the posts and preclude the possibility of arcing between the contacts and the grounded posts. Both ends of the webs 40 are also channeled to form spaced flanges 45 which engage in complementary grooves in the rear wall of the rear or base section and similar grooves or recesses in the front wall 48 of the cover or front section 31; and the lower edges of the two webs or partitions 40 have sliding engagement with grooves in the bottom wall 34 of the rear or base section and in the bottom wall 51 of the cover or front section.

Consequently, the partition walls which divide the arc hood into separated compartments have a tongue and groove interengagement with both the rear or base section and the front or cover section so as to provide an effective seal between the respective compartments. This interengaging tongue and groove joint between the engaging portions of the different sections provides overlapping surfaces of sufficient area to form a tortuous leakage path long enough to cool an arc or hot gases escaping from one compartment into the other so that the possibility of arcing between the different poles of the switch is reduced to a minimum.

As already noted, the front or cover section 31 is similar in many respects to the rear or base section. It provides the front wall 48 of the arc hood and its bottom wall 51 coacts with the bottom wall 34 of the rear or base section to complete the bottom for the arc hood. The side walls 52 of the cover section coact with the side walls 33 of the base section to complete the side walls of the arc hood and like the rear or base section, the inner faces of the front and side walls have continuous and connecting grooves 53 and 53′ to slidably receive the adjacent edge portions of the top wall 28. To accommodate the extremities of the longitudinal rib on the top wall, the side walls 52 have recesses 54 above and communicating with the grooves 53′, these recesses being of a size to just receive the extremities of the longitudinal rib when the top wall is properly assembled but to prevent complete application of the cover when the top wall is improperly mounted.

There is also an interengaging overlapped joint between the abutting edges of the side walls of the front and rear sections, as shown.

Holes in the front wall 48 receive the threaded outer ends of the posts 36 so that by means of nuts 56 threaded on the posts, the three sections comprising the arc hood are held assembled. Obviously, it is only necessary to remove the nuts 56 to permit withdrawal of the cover section when it is desired to expose the contacts for inspection and if a new set of stationary contacts is necessary, the entire top wall may be replaced so that the substitution of contacts is an extremely simple matter.

The bottom wall of the arc hood, which is formed jointly by the bottom walls 34 and 51 of the base and cover sections, respectively, has three holes 57 formed half in the base section and half in the cover section, as illustrated. These holes lead to the separated arc suppressing compartments and are of a size to slidably receive the telescoped spring enclosures 27 with just sufficient clearance for free sliding action. In other words, the telescoped spring enclosures 27 substantially close the holes 57 so that while the movable contacts are actuatable from without the arc suppressing chamber, the completeness of the enclosure afforded thereby is not destroyed to the point of interfering with the confinement of the arc, but it is to be observed that the clearance between the spring enclosures and the walls of the holes is sufficient to facilitate or enable rapid venting of accumulated gases from within the chamber.

In operation, when the electromagnet is energized, the armature is drawn up in a straight line to impart a straight line motion to the contact carrier which lifts all of the movable contacts simultaneously from their switch open positions to which they move by gravity into switch closing positions with each contact arm electrically bridging its respective pair of stationary contacts.

Upon deenergization of the electromagnet, the movable contact unit drops to an open position thus simultaneously disengaging all of the movable contacts from their respective stationary contacts and breaking each line at two places.

The arc which tends to form upon opening of the switch is suppressed and quickly and effectually extinguished.

While it is not positively known just what produces the exceptional arc extinction obtained with this switch, tests indicate that it must be the combined effect of a number of structural features. Possibly the most important element in the chain of causation is the close confinement of the arcs by the enclosure of the contacts within an insulating chamber of restricted volume resulting inter alia in the development of high pressure within the chamber. This, together with the fact that the arcs are positively and forcibly projected in opposite directions away from each other and against opposite walls of the chamber by reason of the relative positions of the stationary contacts and bridging bar and the conductors leading to the contacts, plus the deionizing effect which the silver cadmium alloy of the contacts has upon the closely confined arcs, and the fact that the clearance between the spring enclosures and the holes 57 through which the spring assemblies enter the chamber compartments, facilitates the escape or enables venting of the accumulated gases from the interior of the chamber without delay after extinction of the arc so that the chamber is cleared of any deleterious and objectionable gases to make it ready for a closely following cycle, possibly explains how this desirable arc quenching or suppressing effect is obtained.

Stated briefly, it is thought to be the close confinement of the arc to produce a suppressing pressure, cooling of the arc by contact with closely adjacent wall surfaces, the deionizing effect of the metal of which the contacts are composed and the rapid venting of the accumulated gases after extinction of the arc which brings the desired results.

The cooling effect mentioned is augmented by shallow cavities 60 in the walls which the arcs impinge.

From the foregoing description taken in connection with the accompanying drawings, it will be readily apparent to those skilled in the art, that this invention provides a substantial improvement in the construction and design of plunger type electric switches and that by reason of the novel arc enclosing chamber flash-over between the poles of the switch is effectually prevented and as a consequence, instantaneous rupturing of the arc is practically assured and the interrupting capacity of the switch is materially increased.

It will be also apparent that the inherent design of the switch of this invention makes the same self-insulating so that it may be mounted on any non-insulating support. This very highly desirable feature is the direct result of the particular construction of the arc suppressing chamber in that all live parts of the switch are either carried directly by or enclosed within this chamber which being formed of a good insulating material provides all the insulation for the switch and thus entirely obviates the need for slate or other insulating panels.

What we claim as our invention is:

1. In an electric switch for industrial control service having stationary and movable contacts and terminals for the stationary contacts: a metallic mounting plate; an insulating contact enclosure closed on all sides except for an entrance opening and having the stationary contacts and their terminals mounted thereon with the stationary contacts on the inside and the terminals on the outside of the enclosure, the movable contact being disposed within the enclosure so that an arc drawn between the contacts upon separation thereof is confined to the interior of said enclosure; means mounting the enclosure directly on the metallic plate so that the stationary contacts are secured in fixed relation to the plate but insulated therefrom; an electromagnet mounted on said plate and having an armature; and a driving connection between the armature and the movable contact with a part thereof passing through the entrance opening.

2. In an electric switch: cooperating stationary and movable contacts; a metal back plate; a hollow structure of molded insulating material enclosing the contacts and having the stationary contacts rigidly attached thereto; means rigidly securing said hollow structure directly to the back plate in frontwise removable relation, said securement of the hollow structure to the base plate securing the stationary contacts in definite relationship to the back plate while the contacts and an arc drawn therebetween upon opening of the switch are completely insulated from the back plate; an automatic actuating means rigidly mounted on the back plate so as to have fixed alignment with the contacts; and a driving connection between said automatic actuating means and the movable contacts passing through an opening in one wall of the hollow structure.

3. In an electric switch: pairs of stationary contacts; a movable contact for each pair of stationary contacts adapted to electrically bridge the same; a metal base plate adapted to be mounted in a vertical position; an insulating enclosure fixed to the base plate and enclosing the contacts, said enclosure comprising a base section secured to the metal base, a top section, and a front section; connections between the sections so formed that securement of the front section in position holds the top section against displacement and said connection enabling removal of the front section to afford access to the interior of the enclosure without disturbing the top section; an electromagnet mounted on said base plate and having an armature; a connection between the armature and the movable contacts so that the armature moves the movable contacts in a substantially vertical line; and terminals for the stationary contacts, said terminals and the stationary contacts being mounted on the top section of the enclosure with the terminals on the exterior projecting upwardly away from the contacts.

4. In an electric switch for industrial control service having stationary and movable contacts and terminals for the stationary contacts: a metallic mounting plate; an insulating contact enclosure having an entrance opening and having the stationary contacts and their terminals mounted thereon with the stationary contacts on the inside and the terminals on the outside of the enclosure, the movable contact being disposed within the enclosure so that an arc drawn between the contacts upon separation thereof is substantially confined to the interior of said enclosure; means mounting the enclosure directly on the metallic plate so that the stationary contacts are secured in fixed relation to the plate but insulated therefrom; an electromagnet mounted on said plate and having an armature; and a driving connection between the armature and the movable contact with a part thereof passing through the entrance opening.

5. In an electric switch: pairs of stationary contacts; a movable contact for each pair of stationary contacts adapted to electrically bridge the same; a metal base plate adapted to be mounted in a vertical position; an insulating enclosure fixed to the base plate and enclosing the contacts, said enclosure having an entrance opening and being sectional with one of its sections constituting a front section adapted for frontwise removal to provide quick access to the contacts; an electromagnet mounted on said base plate and having an armature; and a connection between the armature and the movable contacts including a part passing through the entrance opening and movable in a substantially straight line to carry the movable contacts to and from engagement with the stationary contacts in a substantially straight line motion.

6. In an electric switch: a plurality of independently mountable unitary structures; one of said structures comprising a sectional hollow enclosure of insulating material having an entrance opening and cooperative stationary and movable contacts therein; another of said structures comprising movable contact actuating means; a metallic support; means for mounting said structures on the support so that the metallic support affords operative alignment of said structures; said entrance opening in the enclosure being formed by the adjacent edge walls of two of the sections thereof, a driving connection between said actuating means and the movable contacts with a part thereof passing through the entrance opening; and one of said wall forming sections being frontwise removable with respect to said support, whereby ready access may be had to the contacts.

GUSTAV O. WILMS.
HANS PETERSEN.

Disclaimer

Re. 20,676.—*Gustav O. Wilms*, Milwaukee, and *Hans Petersen*, Wauwatosa, Wis. ELECTRIC SWITCH. Patent dated Mar. 22, 1938. Disclaimer filed Dec. 13, 1948, by the assignee, *Allen-Bradley Company*.

Hereby enters this disclaimer to claims 1, 2, 4, 5, and 6 in said specification.

[*Official Gazette January 11, 1949.*]

said enclosure comprising a base section secured to the metal base, a top section, and a front section; connections between the sections so formed that securement of the front section in position holds the top section against displacement and said connection enabling removal of the front section to afford access to the interior of the enclosure without disturbing the top section; an electromagnet mounted on said base plate and having an armature; a connection between the armature and the movable contacts so that the armature moves the movable contacts in a substantially vertical line; and terminals for the stationary contacts, said terminals and the stationary contacts being mounted on the top section of the enclosure with the terminals on the exterior projecting upwardly away from the contacts.

4. In an electric switch for industrial control service having stationary and movable contacts and terminals for the stationary contacts: a metallic mounting plate; an insulating contact enclosure having an entrance opening and having the stationary contacts and their terminals mounted thereon with the stationary contacts on the inside and the terminals on the outside of the enclosure, the movable contact being disposed within the enclosure so that an arc drawn between the contacts upon separation thereof is substantially confined to the interior of said enclosure; means mounting the enclosure directly on the metallic plate so that the stationary contacts are secured in fixed relation to the plate but insulated therefrom; an electromagnet mounted on said plate and having an armature; and a driving connection between the armature and the movable contact with a part thereof passing through the entrance opening.

5. In an electric switch: pairs of stationary contacts; a movable contact for each pair of stationary contacts adapted to electrically bridge the same; a metal base plate adapted to be mounted in a vertical position; an insulating enclosure fixed to the base plate and enclosing the contacts, said enclosure having an entrance opening and being sectional with one of its sections constituting a front section adapted for frontwise removal to provide quick access to the contacts; an electromagnet mounted on said base plate and having an armature; and a connection between the armature and the movable contacts including a part passing through the entrance opening and movable in a substantially straight line to carry the movable contacts to and from engagement with the stationary contacts in a substantially straight line motion.

6. In an electric switch: a plurality of independently mountable unitary structures; one of said structures comprising a sectional hollow enclosure of insulating material having an entrance opening and cooperative stationary and movable contacts therein; another of said structures comprising movable contact actuating means; a metallic support; means for mounting said structures on the support so that the metallic support affords operative alignment of said structures; said entrance opening in the enclosure being formed by the adjacent edge walls of two of the sections thereof, a driving connection between said actuating means and the movable contacts with a part thereof passing through the entrance opening; and one of said wall forming sections being frontwise removable with respect to said support, whereby ready access may be had to the contacts.

GUSTAV O. WILMS.
HANS PETERSEN.

Disclaimer

Re. 20,676.—*Gustav O. Wilms*, Milwaukee, and *Hans Petersen*, Wauwatosa, Wis. ELECTRIC SWITCH. Patent dated Mar. 22, 1938. Disclaimer filed Dec. 13, 1948, by the assignee, *Allen-Bradley Company*.

Hereby enters this disclaimer to claims 1, 2, 4, 5, and 6 in said specification.

[*Official Gazette January 11, 1949.*]